(12) United States Patent
Stautner

(10) Patent No.: US 12,149,149 B2
(45) Date of Patent: Nov. 19, 2024

(54) FIELD COIL SUPPORT STRUCTURE AND MODULAR FIELD COIL DESIGN IN A SUPERCONDUCTING MACHINE

(71) Applicant: General Electric Company, Schenectady, NY (US)

(72) Inventor: Ernst Wolfgang Stautner, Niskayuna, NY (US)

(73) Assignee: GENERAL ELECTRIC RENOVABLES ESPAÑA, S.L., Barcelona (ES)

( * ) Notice: Subject to any disclaimer, the term of this patent is extended or adjusted under 35 U.S.C. 154(b) by 360 days.

(21) Appl. No.: 17/612,334

(22) PCT Filed: May 24, 2019

(86) PCT No.: PCT/US2019/034022
§ 371 (c)(1),
(2) Date: Nov. 18, 2021

(87) PCT Pub. No.: WO2020/242445
PCT Pub. Date: Dec. 3, 2020

(65) Prior Publication Data
US 2022/0302815 A1    Sep. 22, 2022

(51) Int. Cl.
*H02K 55/02*    (2006.01)
*H02K 3/47*    (2006.01)
(Continued)

(52) U.S. Cl.
CPC .............. *H02K 55/02* (2013.01); *H02K 3/47* (2013.01); *H02K 9/20* (2013.01); *H02K 11/012* (2020.08)

(58) Field of Classification Search
CPC ........ H02K 11/012; H02K 21/10; H02K 3/47; H02K 55/02; H02K 9/20; Y02E 40/60
See application file for complete search history.

(56) References Cited

U.S. PATENT DOCUMENTS

| | | | |
|---|---|---|---|
| 4,319,149 A | * | 3/1982 | Eckels .................. H02K 55/04 310/265 |
| 4,467,303 A | | 8/1984 | Laskaris |

(Continued)

FOREIGN PATENT DOCUMENTS

| | | | |
|---|---|---|---|
| BR | 102018077486 A2 * | 7/2019 | ............... H02K 1/16 |
| CN | 101425728 A | 5/2009 | |

(Continued)

OTHER PUBLICATIONS

BR-102018077486-A2, Kaneshige K, all pages (Year: 2019).*

(Continued)

*Primary Examiner* — Naishadh N Desai
(74) *Attorney, Agent, or Firm* — Dority & Manning, P.A.

(57) ABSTRACT

An electric machine including an annular armature assembly and a non-rotating annular field winding assembly coaxial with the armature assembly and separated by a gap from the armature assembly. The field winding assembly including a field coil support structure having an annular array of recesses formed therein and extending about the field coil support structure. The field winding assembly further including a plurality of superconducting coils, each disposed in a recess of the annular array of recesses. A generator and a method for generating electrical power are disclosed.

18 Claims, 3 Drawing Sheets

(51) Int. Cl.
   *H02K 9/20*     (2006.01)
   *H02K 11/01*    (2016.01)

(56) References Cited

U.S. PATENT DOCUMENTS

| | | | |
|---|---|---|---|
| 6,680,549 B2 | 1/2004 | Boardman et al. | |
| 8,692,433 B2 | 4/2014 | Eugene et al. | |
| 9,048,015 B2 | 6/2015 | Nick et al. | |
| 9,148,035 B2 | 9/2015 | Frank et al. | |
| 9,407,126 B2 | 8/2016 | Scuotto et al. | |
| 2008/0161189 A1 | 7/2008 | Lewis et al. | |
| 2008/0197633 A1* | 8/2008 | Laskaris | F03D 15/20 290/55 |
| 2010/0133943 A1 | 6/2010 | Winn | |
| 2011/0316357 A1* | 12/2011 | Braun | H02K 41/02 310/12.09 |
| 2013/0181553 A1 | 7/2013 | Wu et al. | |
| 2013/0261000 A1 | 10/2013 | Tanner et al. | |
| 2015/0207365 A1* | 7/2015 | Haran | H02K 55/04 310/55 |
| 2016/0276918 A1 | 9/2016 | Morrison | |
| 2019/0222082 A1* | 7/2019 | Witczak | H02K 21/12 |
| 2020/0169158 A1 | 5/2020 | Buhrer et al. | |

FOREIGN PATENT DOCUMENTS

| | | |
|---|---|---|
| CN | 102857057 A | 1/2013 |
| CN | 104038028 A | 9/2014 |
| CN | 104067494 A | 9/2014 |
| CN | 107612287 A | 1/2018 |
| EP | 0805545 A1 | 11/1997 |
| EP | 1959548 A1 | 8/2008 |
| JP | S 56-150966 A | 11/1981 |
| JP | S 61-196762 A | 8/1986 |
| JP | 4068265 B2 | 3/2008 |
| JP | 2018007480 A | 1/2018 |
| KR | 1020130077462 A * | 12/2011 |

OTHER PUBLICATIONS

KR-20130077462-A, all pages, MKo (Year: 2011).*
PCT International Search Report & Opinion Corresponding to PCT/US2019/034022 on Jan. 27, 2020.
Fair et al., Superconductivity for Large Scale Wind Turbines, General Electric—Global Research, Apr. 30, 2012, 78 Pages.
Goddard et al., Alternative Designs of High-Temperature Superconducting Synchronous Generators, IEEE Transactions on Applied Superconductivity, vol. 19, Issue 6, Dec. 2009, pp. 3805-3811.
Wen et al., Coil Shape Optimization for Superconducting Wind Turbine Generator Using Response Surface Methodology and Particle Swarm Optimization, IEEE Transactions on Applied Superconductivity, vol. 24, Issue 3, Jun. 2014, pp. 1-4.
Japanese Office Action, 26, 2023.
Chinese Office Action with Translation, Jul. 7, 2024.

* cited by examiner

FIELD COIL SUPPORT STRUCTURE AND MODULAR FIELD COIL DESIGN IN A SUPERCONDUCTING MACHINE

BACKGROUND

This invention relates to electrical generators and, particularly, relates to electric machines including superconducting windings and maintaining and/or decreasing a magnetic gap between the field coils and armature winding coils during and subsequent to superconducting magnet cooldown.

Generally described, typical electrical machines such as motors and generators include field coils and armature winding coils. Once a voltage is applied, a magnetic field couples the field coils and the armature winding coils. The magnitude of the magnetic field depends upon the amount of current passing through the field coils. The magnetic stress within the electrical machine translates to torque so as to result in the rotation of a rotor. The higher the magnetic field, the greater the torque per rotation for a given circumference of the armature winding coils. Using field coils made from superconducting material makes the electrical machine more compact, lightweight, and efficient due to the increased magnetic field strength caused by the superconducting material. Of particular interest herein are superconducting generators described as a field coil inside (FCI) configuration.

In a typical superconducting generator, field coils are formed on a large, main coil former structure commonly formed of aluminum. During cool down of the field coils from room temperature to an operating temperature of near absolute zero, thermal shrinkage of the field coil former structure occurs in a radial and axial direction. The radial shrinkage of the field coil former structure results in an increase in magnetic gap between the field coils and the armature winding coils. This increase in magnetic gap results in the performance, and thus efficiency, of the superconducting generator being degraded. Depending on the design, this can be up to 65 mm, for example, for a typical field coil former structure having a radii of 4 m or greater.

There is a long felt need for a superconducting generator capable of generating multi Mega Watts (MW), e.g., 10 to 35 MW, of electrical power, that incorporates a means for maintaining a minimum magnetic gap between the field coils and the armature winding coils. The needed generator should be highly reliable and have a reasonable size and weight to allow for economical shipping and installation.

BRIEF DESCRIPTION OF THE INVENTION

Aspects and advantages of the disclosure are set forth below in the following description, or may be obvious from the description, or may be learned through practice of the disclosure.

In accordance with one embodiment, an electric machine is disclosed. The electric machine includes an annular armature assembly and a non-rotating annular field winding assembly coaxial with the armature assembly and separated by a gap from the armature assembly. The non-rotating annular field winding assembly including a field coil support structure and a plurality of superconducting coils. The field coil support structure including an annular array of recesses formed therein and extending about the field coil support structure. Each of the plurality of superconducting coils disposed in a recess of the annular array of recesses.

In accordance with another embodiment, a generator is disclosed. The generator includes an annular armature assembly and a non-rotating annular field winding assembly coaxial with the armature assembly and separated by a gap from the armature assembly. The non-rotating annular field winding assembly including a field coil support structure and a plurality of superconducting coils. The field coil support structure formed of a non-shrinking material having a negligible coefficient of thermal expansion. Each of the plurality of superconducting coils disposed relative to the field coil support structure.

In accordance with yet another embodiment, a method for generating electrical power is disclosed. The method includes generating a magnetic field in a non-rotating annular field winding assembly in a generator, rotating an armature assembly of the generator, generating electrical current in the armature assembly by the rotation of the armature around the non-rotating annular field winding assembly and cooling the plurality of superconducting coils to a superconducting condition using a cooling liquid that is at least partially vaporized as it cools the plurality of superconducting coils. The field winding assembly including a field coil support structure and a plurality of superconducting coils. The field coil support structure including an annular array of recesses formed therein and extending about the field coil support structure. Each of the plurality of superconducting coils is disposed in a recess of the annular array of recesses. The armature assembly is coaxial and electromagnetically coupled to the non-rotating annular field winding assembly, wherein the non-rotating annular field winding assembly is separated by a gap from the armature assembly. The field coil support structure is comprised of a material having a low coefficient of thermal expansion to maintain a dimension of the gap between the non-rotating annular field winding assembly and the armature assembly during cooling of the plurality of superconducting coils to the superconducting condition.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Corresponding reference characters indicate corresponding parts throughout the several views of the drawings.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A superconducting alternating current (AC) generator has been developed including an armature winding disposed about a field coil winding.

Figure 1:
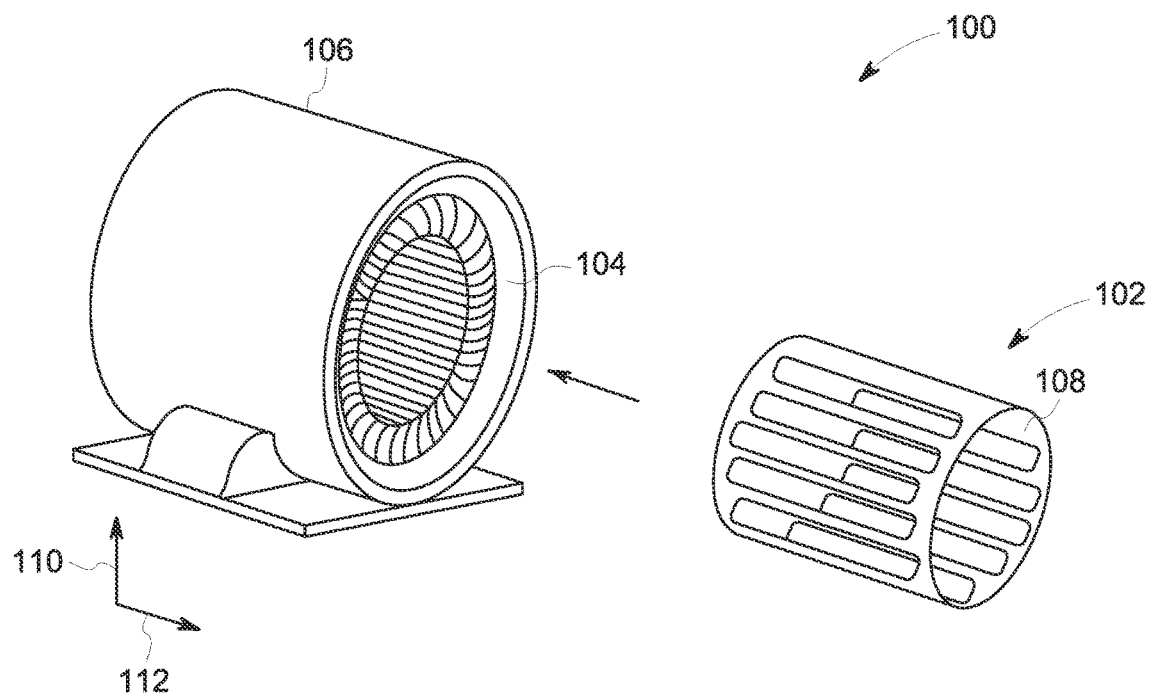
FIG. 1 is a schematic diagram of a superconducting generator illustrating an armature assembly separate from a non-rotating, or stationary, field winding, in accordance with one or more embodiments of the present disclosure.
Figure 2:
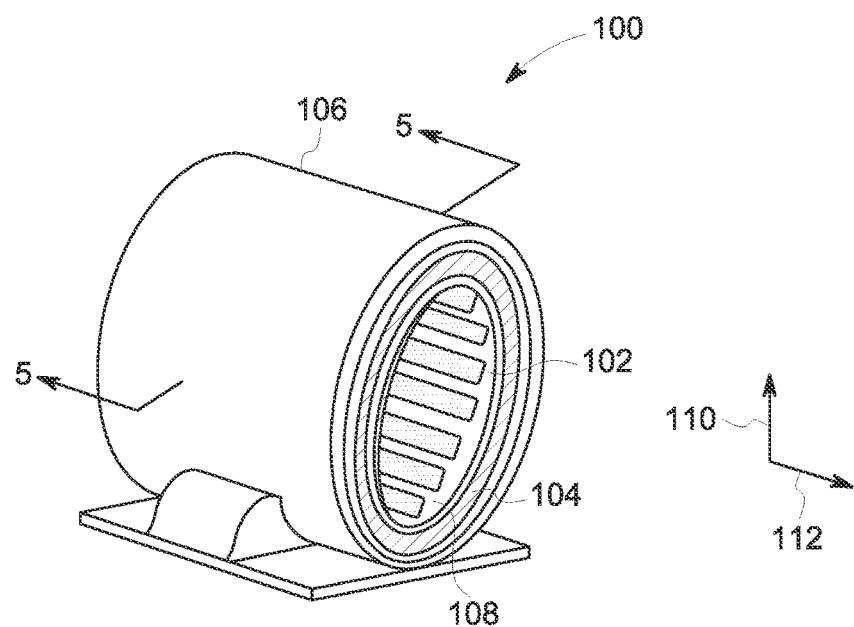
FIG. 2 is a schematic diagram of a superconducting generator illustrating the armature disposed about the field winding and including modular field coils, in accordance with one or more embodiments of the present disclosure.

FIGS. 1 and 2 are schematic diagrams of a superconducting generator 100, in accordance with one embodiment of the present disclosure, in a disassembled (FIG. 1) configuration and an assembled (FIG. 2) configuration. The superconducting generator 100 may be representative of one embodiment of the superconducting generator used in a wind turbine, a motor or generator, for example in an application where the generator is driven by a gas turbine. The superconducting generator 100 depicted in FIGS. 1 and 2 is a radial field electric machine configured having a field coil inside (FCI) design. Reference numerals 110 and 112, respectively, represent a radial direction and an axial direction of the superconducting generator 100.

As depicted in FIGS. 1 and 2, the superconducting generator 100 includes a non-rotating, also referred to herein as stationary, annular field winding assembly 102 and an annular rotating armature assembly 104 disposed in a housing 106. In particular, FIG. 1 depicts an exploded view of the superconducting generator 100 to separately show the non-rotating field winding assembly 102 and the annular rotating armature assembly 104.

The non-rotating field winding assembly 102 is disposed adjacent to the annular rotating armature assembly 104. As used herein, the term "disposed adjacent to" with respect to positioning of the non-rotating field winding assembly 102 and the annular rotating armature assembly 104, refers to relative positioning of the non-rotating field winding assembly 102 and the annular rotating armature assembly 104 such that the non-rotating field winding assembly 102 is surrounded by the annular rotating armature assembly 104 (as illustrated in FIG. 2), in one embodiment.

Further, the non-rotating field winding assembly 102 comprises a superconducting field winding 108. The superconducting field winding may include one or more modular field coils (not shown) made using electrically conductive materials that transition to a superconducting state at sufficiently low temperatures. Such materials include niobium tin alloy, niobium titanium alloy, magnesium diboride alloy, any of a number of ceramic materials that have exhibited superconducting properties, or combinations thereof. Often electrically conductive materials including, such as, but not limited to, copper, aluminum, anodized aluminum, silver, gold, or combinations thereof are used in combination with superconducting alloys for improved mechanical properties. In certain embodiments, low weight electrically conductive materials may be used to increase or at least maintain a power density of the superconducting generator 100. In some embodiments, the superconducting generator 100 may also include suitable arrangement (not shown) for cooling the superconducting field winding to cryogenic temperatures. In an embodiment, the rotating armature assembly 104 may be superconducting.

By way of example, in some embodiments, when the superconducting generator 100 is deployed as the superconducting generator in a wind turbine, the annular rotating armature assembly 104 may be coupled to the rotor of the wind turbine. Consequently, the annular rotating armature assembly 104 may be rotated due to the rotations of the rotor caused due to the wind energy. Due to the rotations of the annular rotating armature assembly 104, the superconducting generator 100 may generate electrical power by virtue of the voltage induced in armature winding as they move past the magnetic field established by the superconducting field winding 108.

Figure 3:
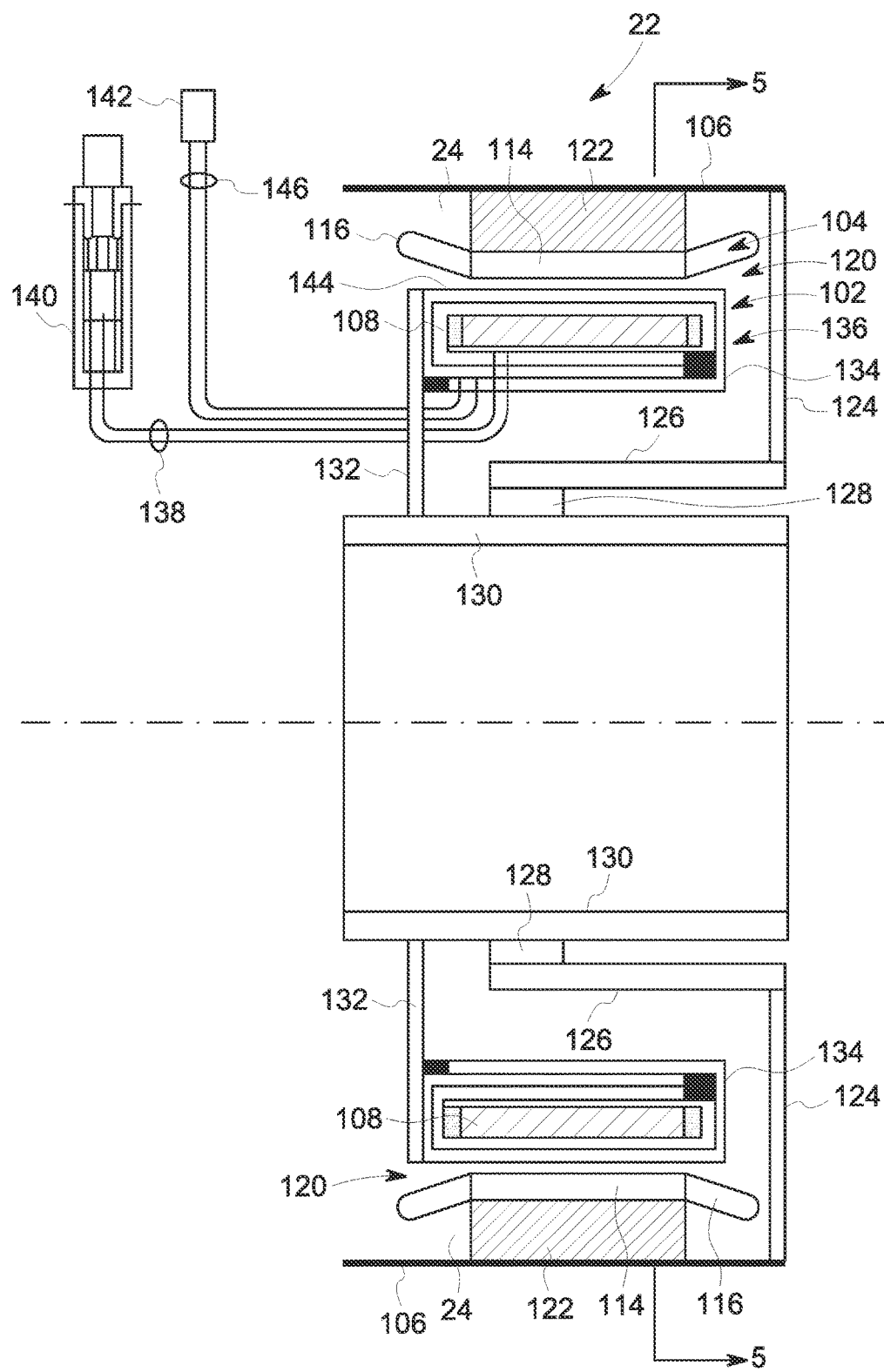
FIG. 3 is a schematic diagram showing in cross-section a superconducting generator having an annular rotating armature and a non-rotating super-conducting field winding surrounded by the armature, in accordance with one or more embodiment presented herein.

Referring now to FIG. 3, illustrated in a schematic cross-section is the superconducting generator 100 having a non-rotating super-conducting field winding assembly 102 surrounded by the annular rotating armature assembly 104. The rotating armature assembly 104 is configured as an outer annular ring around the field winding assembly 102. The armature assembly 104 is formed conventionally and may comprise conductive windings 114, e.g., coils or bars, arranged longitudinally along the length of the armature assembly 104 and on an inside cylindrical surface of the armature assembly 104. By way of example, the longitudinal sections of the armature windings 114 may be 29 to 30 inches in length, have a thickness of 4 to 5 inches and an inside diameter of between 135 to 136 inches. The coils or bars may be connected at their opposite ends to one another by conductive end turns 116. The end turn connections 116 between the longitudinal coils or bars are dependent on their number and arrangement, and the phases of electricity to be generated in the armature windings 114. The inside cylindrical surface of the armature windings 114 is separated by a narrow air gap 120, e.g., about 1-2 inches, from the outer surface of the non-rotating field winding assembly.

The armature assembly 104 includes a cylindrical yoke 122 that supports the conductive windings 114. The outer surface of the yoke 122 is fixed to the cylindrical housing 106 that rotates with the armature assembly 104. The diameter of the housing 106 may be, for example, between 147 to 148 inches and have a length of 58 inches. The housing is fitted to a circular disc 124 that supports the housing 106 and the annular rotating armature assembly 104.

A rotating cylindrical support tube 126 is positioned radially inward of the armature winding 114. A pair of annular bearings 128 are arranged towards opposite ends of a non-rotating base tube 130 enabling rotation of the armature assembly 104 about the non-rotating field winding assembly 102.

The non-rotating base tube 130 supports a field winding support disc 132 on which is mounted the non-rotating field winding assembly 102. The field winding support disc 132 may have cut-outs or holes (not shown) to reduce weight. The field winding support disc 132 is attached to an end of a cryostat housing 134 containing the superconducting coils (described presently) of the superconducting field winding 108. The cryostat housing 134 and its cooling components form a cryostat 136 that cools the superconducting coils of the superconducting field winding 108. The cryostat housing 134 may be annular, rectangular in cross section, have an outside diameter of between 134 and 135 inches, and a length of 49 inches. The dimensions of the cryostat housing 134 and other components of the generator are a matter of design choice and may vary depending on the design of the generator.

The cryostat 136 insulates the superconducting coils of the non-rotating field winding 108 so that they may be cooled to near absolute zero, e.g., to 10 Kelvin (K) and preferably to 4K. To cool the superconducting coils, the cryostat housing 134 includes insulated conduits 138 to receive liquid helium (He) or other similar cryogenic liquid (referred to as cryogen). A conventional two-stage re-condenser 140 provides cryogen, e.g., liquid He, using a gravity feed. The cryogen flows around the superconducting coils of the non-rotating field winding 102 and cools the coils to achieve a superconducting condition. The coils are cooled, e.g., to 4 degree K, as the He at least partially vaporizes. The He vapor flows through one of the conduits 138 to the re-condenser 140, where the He is cooled, liquified and returned via conduit 138 to the coils. The power conductors for the superconducting coils also pass through the cryostat housing 134 with the insulated conduits 138 for the helium.

A second re-condenser 142 provides a second cooling liquid, e.g., liquid nitrogen or neon, to an inner thermal shield 144 of the cryostat housing 134 for the superconducting winding 108. The second cooling liquid cools the thermal shield 144 for the superconducting coils to about 30 degree K to 80 degree K. Cooling the thermal shield 144 assists in supercooling the superconducting winding 108 by reducing the thermal radiation heat adsorbed by the Helium. The second re-condenser 142 receives the vaporized liquid nitrogen or neon from the thermal shield 144, liquefies the nitrogen or neon, and provides liquid nitrogen or neon to the thermal shield 144 via insulated conduits 146.

Torque is applied to turn the annular rotating armature assembly 104 around the non-rotating field winding assembly 102. Torque is applied by the annular rotating armature assembly 104 to the non-rotating field winding assembly 102 due to electromagnetic force (EMF) coupling.

Figure 4:
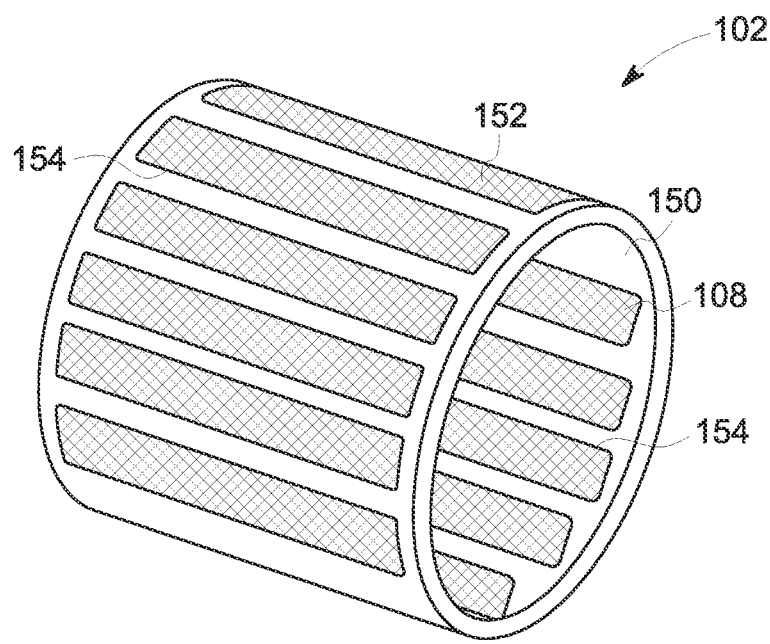
FIG. 4 is a perspective view of a coil former structure including a plurality of modular field coils of the superconducting field winding in accordance with one or more embodiment presented herein.
Figure 5:
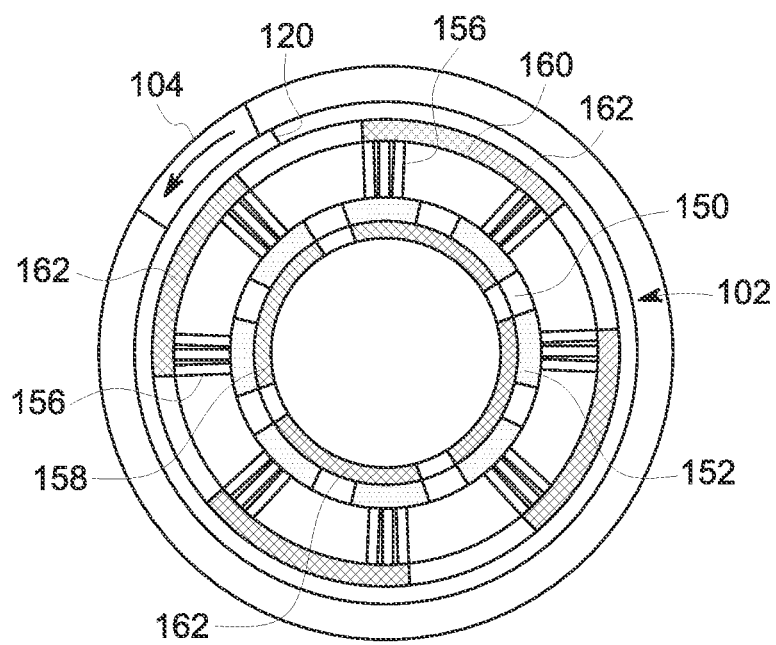
FIG. 5 is a cross-sectional view taken through line 5-5 of FIG. 3, in accordance with one or more embodiment presented herein.

Referring now to FIGS. 4 and 5, illustrated in a simplified isometric view (FIG. 4) is a portion of the non-rotating field winding assembly 102, and more particularly, a coil former or support structure 150 and a schematic cross-section (FIG. 5) of a portion of the superconductor generator of FIG. 3, taken through line 5-5 of FIG. 3. Illustrated is the non-rotating field assembly 102, including the field coil support structure 150 for a plurality of superconducting coils 152. In an embodiment, the plurality of superconducting coils 152 are generally race-track shaped. More specifically, each superconducting coil 152 is comprised of a group of wires formed in a racetrack shape. The coils 152 are potted to retain the racetrack shape. Each racetrack may have a longitudinal section of two parallel sections that is 29 to 30 inches long and a width of 10 inches, for example. The field coil support structure 150 forms a support to hold the plurality of superconducting field coils 152.

Of particular concern herein is the shrinking of the field coil support structure 150 in the radial direction 110 (FIG. 2) during and subsequent to cool down of the superconducting field coils 152. To minimize, if not eliminate, such shrinking of the field coil support structure 150, the field coil support structure 150 disclosed herein is formed of light weight material that provides minimal, if not eliminates, shrinking of the structure during cool down. In an embodiment the field coil support structure 150 is formed of any material that is known for its relative lack of expansion or contraction with temperature changes. In an embodiment, the field coil support structure 150 is formed of a nickel-cobalt ferrous alloy, such as Kovar or Invar, and more particularly, a controlled expansion alloy having a chemical composition that is held within narrow limits to provide precise uniform thermal expansion properties. These nickel-cobalt ferrous alloy materials are known for having uniquely low coefficients of thermal expansion. In another embodiment, the field coil support structure 150 is formed of a composite material, such as a reinforced polymer that is designed such that they do not shrink, or only minimally expand during or subsequent to cooldown, dependent on the composite fiber winding angle.

The field coil support structure 150 includes an annular array of hollow recesses 154, each configured to receive one of the plurality of race-track shaped superconducting coils 152. Each superconducting coil 152 is supported in a recess 154 in an annular array extending around the field coil support structure 150 and is cooled by a bath of helium to cryogenic temperatures. For example, thirty-six (36) coils 152 may form an annular array of field windings that serve as the stator field winding for the generator. The superconducting coils 152 may be each formed of (NbTi) wire wrapped in a helix around a racetrack form that may include cooling conduits for the helium.

More particularly, each of the plurality of race-track shaped superconducting coils 152 is seated in a respective recess 154 by a snap-fit design (integral attachment) to secure the coil 152 in the recess 154. Accordingly, each of the plurality of race-track shaped superconducting coils 152 positioned relative to a respective recess 154 to form an interlocking joint. The superconducting coils 152 tend to magnetically move radially towards the armature coils. By snap fitting the superconducting coils 152 into the field coil support structure 150, the superconducting coils 152 are locked and retained within the recesses 154 formed in the field coil support structure 150.

Referring more specifically to FIG. 5, in an embodiment, an inner thermal shield 158 and an outer thermal shield 160 are disposed about the field coil support structure 150. The thermal shields 158, 160 are each configured as a tubular, cylindrical structure. Of concern is the shrinking of the outer thermal shield 160 in the radial direction 110 (FIG. 2) during and subsequent to cool down of the superconducting field coils 152. Due to the lack of shrinking of the field coil support structure 150 as disclosed herein, shrinkage of the outer thermal shield 160 in the radial direction 110 would result in the outer thermal shield 160 touching the field coil support structure 150 resulting in the inability to operate the field coils 152 due to the high heat loads.

To minimize, if not eliminate, such shrinking of the outer thermal shield 160, the outer thermal shield is comprised of a plurality of radially segmented aluminum shields 162. In an embodiment, the inner thermal shield 158 may additionally be comprised of a plurality of radially segmented aluminum shields 162 enabling the vacuum envelope to remain as small and tight as possible. By forming the outer thermal shield 160 as a radial segmented structure 162, any shrinkage in the radial direction 110, or diameter shrinkage, would be "broken" and each segment 162 of the outer thermal shield 160 would only be susceptible to shrinkage with respect to a thickness of each segment 162. In an embodiment, each thermal shield segment 162 of the outer thermal shield 160 is approximately 5 to 10 mm. For a shield thickness of this minimal dimension, the shrinkage after cool down would be 4.3 per mille, meaning it would shrink 0.0215 mm for a 5 mm wall thickness.

As best illustrated in FIG. 5, in an embodiment a plurality of short and low thermal conductance support pillars 156 are disposed to support and stabilize the segmented thermal shield structure 162 of the outer thermal shield 160 relative to the field coil support structure 150. Each of the plurality of support pillars 156 serves as a thermal support column that bears the weight of a respective segmented thermal shield structure 162. Each of the support pillars 156 may be designed to expand rather than shrink depending on the cryostat design. In an embodiment, support pillars capable of providing such support are commonly referred to as Heim columns.

During a process of generating electrical power, a magnetic field is generated in the non-rotating annular field winding assembly. The armature assembly is rotating about the non-rotating annular field winding assembly to generate electrical current in the armature assembly. The plurality of superconducting coils of the non-rotating annular field winding assembly are cooled to a superconducting condition using a cooling liquid that is at least partially vaporized as it cools the plurality of superconducting coils. A field coil support structure of the non-rotating annular field winding assembly is comprised of a material having a low coefficient of thermal expansion to maintain a dimension of a magnetic gap between the non-rotating annular field winding assembly and the armature assembly during cooling of the plurality of superconducting coils to the superconducting condition.

A generator with the superconducting field winding assembly, including a plurality of modular semiconductor field coils, a field coil support structure, and an outer armature, and method of operation, as described above, would have high torque density and be of relatively light weight. The generator may achieve a power output of 10 MW or more and be light weight. In an embodiment, the superconducting generator is capable of generating multi Mega Watts (MW), e.g., 10-35 MW, of electrical power, such as in a wind application. In another embodiment, the superconducting generator is capable of generating multi MW, e.g., 100 MW or greater, of electrical power, such as in a superconducting ship propulsion system.

The superconducting field winding assembly minimizes, if not eliminates, shrinking of the magnetic gap formed between the semiconductor assembly and the armature assembly during, and subsequent, to superconducting magnet cooldown. By maintaining the magnetic gap so that that gap is not widened, the benefit of the superconducting field winding magnetic field extension into the magnetic gap is maintained and higher flux densities are obtained, resulting in a cost benefit. In addition, as an additional cost benefit, a percentage of the superconducting wire cost in the superconducting system may be saved. If the magnetic gap is not maintained and the gap size is increased, performance and efficiency of the superconducting generator may be severely degraded.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electric machine comprising:
   an annular armature assembly; and
   a non-rotating annular field winding assembly coaxial with the armature assembly and separated by a gap from the armature assembly, wherein the field winding assembly comprises:
      a field coil support structure having an annular array of recesses formed therein and extending about the field coil support structure;
      a plurality of superconducting coils, each of the plurality of superconducting coils disposed in a recess of the annular array of recesses; and
      at least one segmented thermal shield disposed about the plurality of superconducting coils and one or more support pillars disposed to support the at least one segmented thermal shield relative to the plurality of superconducting coils.

2. The electric machine as claimed in claim 1, wherein the armature assembly is formed about the non-rotating annular field winding assembly to define a field coil inside (FCI) configuration.

3. The electric machine as claimed in claim 1, wherein each of the plurality of superconducting coils is a racetrack shaped superconducting coil.

4. The electric machine as claimed in claim 1, wherein each of the plurality of superconducting coils forms a snap-fit joint within a respective one of the annular array of recesses.

5. The electric machine as claimed in claim 1, wherein the field coil support structure is formed of a material having a low coefficient of thermal expansion.

6. The electric machine as claimed in claim 5, wherein the field coil support structure is formed of Invar.

7. The electric machine as claimed in claim 5, wherein the field coil support structure is formed of Kovar.

8. A generator comprising:
   an annular armature assembly; and
   a non-rotating annular field winding assembly coaxial with the armature assembly and separated by a gap from the armature assembly, wherein the field winding assembly comprises:
      a field coil support structure formed of a non-shrinking material having a negligible coefficient of thermal expansion;
      a plurality of superconducting coils, each of the plurality of superconducting coils disposed relative to the field coil support structure; and
      at least one segmented thermal shield disposed about the plurality of superconducting coils and one or more support pillars disposed to support each of the at least one segmented thermal shields relative to the plurality of superconducting coils.

9. The generator as claimed in claim 8, wherein the armature assembly is formed about the non-rotating annular field winding assembly to define a field coil inside (FCI) configuration.

10. The generator as claimed in claim 8, wherein each of the plurality of superconducting coils is a racetrack shaped superconducting coil.

11. The generator as claimed in claim 8, wherein each of the plurality of superconducting coils is coupled to the field coil support structure.

12. The generator as claimed in claim 8, wherein the field coil support structure includes an annular array of recesses formed therein and extending about the field coil support structure.

13. The generator as claimed in claim 12, wherein each of the plurality of superconducting coils is disposed in a recess of the annular array of recesses.

14. The generator as claimed in claim 13, wherein each of the plurality of superconducting coils forms a snap-fit joint within a respective one of the annular array of recesses.

15. The generator as claimed in claim 8, wherein the field coil support structure is formed of Invar.

16. The generator as claimed in claim 8, wherein the field coil support structure is formed of Kovar.

17. The generator as claimed in claim 8, wherein the generator achieves a power output of 10 MW or higher.

18. A method for generating electrical power comprising:
generating a magnetic field in a non-rotating annular field winding assembly in a generator, wherein the non-rotating annular field winding assembly comprises:
a field coil support structure having an annular array of recesses formed therein and extending about the field coil support structure;
a plurality of superconducting coils, each of the plurality of superconducting coils disposed in a recess of the annular array of recesses; and
at least one segmented thermal shield disposed about the plurality of superconducting coils and one or more support pillars disposed to support each of the at least one segmented thermal shields relative to the plurality of superconducting coils;
rotating an armature assembly of the generator, wherein the armature assembly is coaxial and electromagnetically coupled to the non-rotating annular field winding assembly, wherein the non-rotating annular field winding assembly is separated by a gap from the armature assembly;
generating electrical current in the armature assembly by the rotation of the armature assembly around the non-rotating annular field winding assembly; and
cooling the plurality of superconducting coils to a superconducting condition using a cooling liquid that is at least partially vaporized as it cools the plurality of superconducting coils,
wherein the field coil support structure is comprised of a material having a low coefficient of thermal expansion to maintain a dimension of the gap between the non-rotating annular field winding assembly and the armature assembly during cooling of the plurality of superconducting coils to the superconducting condition.

* * * * *